(12) United States Patent
Hampel et al.

(10) Patent No.: US 8,699,708 B2
(45) Date of Patent: Apr. 15, 2014

(54) LIGHT-WEIGHT SECURITY SOLUTION FOR HOST-BASED MOBILITY AND MULTIHOMING PROTOCOLS

(75) Inventors: Karl Georg Hampel, New York, NY (US); Vladimir Y. Kolesnikov, Jersey City, NJ (US)

(73) Assignee: Alcatel Lucent, Paris (FR)

( * ) Notice: Subject to any disclaimer, the term of this patent is extended or adjusted under 35 U.S.C. 154(b) by 471 days.

(21) Appl. No.: 12/803,504

(22) Filed: Jun. 29, 2010

(65) Prior Publication Data

US 2011/0320803 A1    Dec. 29, 2011

(51) Int. Cl.
*H04L 29/06*        (2006.01)
(52) U.S. Cl.
USPC ............ 380/247; 713/181; 713/189; 380/270
(58) Field of Classification Search
USPC .................................................. 380/247
See application file for complete search history.

(56) References Cited

U.S. PATENT DOCUMENTS

| | | | | |
|---|---|---|---|---|
| 2003/0211842 A1* | 11/2003 | Kempf et al. | | 455/411 |
| 2010/0161817 A1* | 6/2010 | Xiao et al. | | 709/229 |
| 2010/0325709 A1* | 12/2010 | Kawase | | 726/7 |
| 2011/0016321 A1* | 1/2011 | Sundaram et al. | | 713/171 |

FOREIGN PATENT DOCUMENTS

| | | |
|---|---|---|
| EP | 1914953 | 4/2008 |
| EP | 2061200 | 5/2009 |

OTHER PUBLICATIONS

Charles E. Perkins; Mobile IP; IEEE Communications Magazine; IEEE Service Center, Piscataway, US; vol. 40, No. 5; May 1, 2002; pp. 66-82; XP011092854; ISSN: 0163-6804.

* cited by examiner

*Primary Examiner* — Mohammad L Rahman
(74) *Attorney, Agent, or Firm* — Carmen Patti Law Group, LLC

(57) ABSTRACT

A transport connection system is set forth. The system includes a first device adapted to send and receive messages. A second device, adapted to send and receive message, is also provided. A message i generated by the first device includes a secret $R_{i-1}$ to a Hash $(R_{i-1})$ sent from the first device to the second device in a prior message i-1. The message i is signed by a random key $A_{i-1}$, the random key being derived from an update of a key $A_{i-2}$ from the prior message, wherein message i-1 is signed by the key $A_{i-2}$.

25 Claims, 9 Drawing Sheets

BU HANDSHAKE (index i):

MN —310                                                              330
                                                                      CN

Generate and cache random number: $R_i$ —312

Request: MID, $R_{i-1}$, Hash($R_i$), HMAC($A_{i-1}$|MSG) → —320

340— Verify cached: Hash($R_{i-1}$)
                                                 Verify: HMAC($A_{i-1}$|MSG)
BU Handshake                                     Cache: Hash($R_i$)
                                                 Generate random key: dA
                                                 Cache: $A_i = A_{i-1}$  dA ← Reply: MID, dA, HMAC($A_{i-1}$|MSG)

Cache: $A_i = A_{i-1}$  dA

MA Binding Update

For the MA Binding Update, the RRT is combined with the KU. This leads to the following handshake:

MN — 410                                                                                   420
                                                                                              )
                                                                                              CN

Obtain new IPaddress
Create and cache random nonce $R_i$
    Request MID, $R_{i-1}$, Hash($R_i$), HMAC($A_{i-1}$|MSG) →
              Verify Hash($R_{i-1}$)
              Verify HMAC($A_{i-1}$|MSG)
                Cache Hash($R_i$)

Update
            Create and cache new random key dA
                Cache $A_i = A_{i-1}$ ⊕ dA
    440 — Temporarily cache MN's new IP address
                Create random number X
← Challenge/Reply: MID, dA, X, HMAC($A_{i-1}$|MSG) — 450
(CHALLENGE)
Cache $A_i = A_{i-1}$ ⊕ dA
        Response: MID, X →
                   Verify X
      460 — Cache MN's new IP address
       ← Optional Ack: MID

FIG. 4

LIGHT-WEIGHT SECURITY SOLUTION FOR HOST-BASED MOBILITY AND MULTIHOMING PROTOCOLS

CROSS-REFERENCE TO RELATED APPLICATIONS

None

STATEMENT AS TO RIGHTS TO INVENTING MADE UNDER FEDERALLY-SPONSORED RESEARCH AND DEVELOPMENT

None

FIELD OF THE INVENTION

The invention relates generally to host-based mobility and multi-homing protocols, and more specifically to mobility protocols that efficiently and cost-effectively update changes in transport connections while providing sufficient security at a reasonable cost.

BACKGROUND

Mobile internet traffic has increased dramatically in recent years, particularly since the advent of the latest generation of smart phones. Advances in phone technology have dramatically increased internet traffic, and have forced the research community to rethink the existing concepts of IP mobility and multi-homing. One basic tenant of IP mobility is for a host to be able to change a L3 attachment point, i.e. IP address, during an ongoing transport session. A multi-homed host that needs to be able to selectively switch ongoing sessions to a different interface, such as, for example, from a 3G wireless network to WiFi, must also be able to change an IP attachment point.

Designing protocols for communication devices via public infrastructure inherently involves serious consideration of security issues, due to the public nature of, for example, the internet. In a public forum, adversaries can misuse information, and redirect transport sessions for malicious purposes. Such redirection attacks allow the adversary to hijack, for example, a communication session, and continue the session on behalf of one of the session end points.

Adversaries can also use access to the session for distributing Denial-of-Service (DoS) attacks, where the adversary steers high volume traffic toward a victim host. DoS attacks are also known as flooding.

Redirection and flooding each introduce different security problems with often very different solutions.

For example, the available mechanisms to protect against redirection attacks depend on the mobility technology. Current mobility standards, such as W-CDMA, LTE and WiMAX, use network-based mobility. These technologies employ network-side anchors to relay all traffic between a Mobile Node (MN) and its peers. All mobility-related signaling is exchanged between the MN and the network(side anchors?), which can be secured by exploiting trust relationships that exist between a subscriber and his service provider.

Alternatively, host-based mobility allows the MN to update a Correspondent Node (CN), when the MN has changed its IP address. In response, the CN can directly send data packets to the MN's new address. As a result, host-based mobility protocols are more cost-effective, versatile and scalable, since they eliminate the need for network side anchors. The advantages of host-based mobility systems have sparked a good deal of research activity attempting to establish suitable low cost host-based mobility protocols. Examples of such protocols can include, the Host-Identifier Protocol (HIP), route-optimized Mobile IPv6 (MIPv6 R/O), TCP-R and EMIPv6, to name a few of the more well known protocols to date.

Some of the known host-based protocols support multi-homing scenarios. Specifically, in the multi-homing scenarios, the host can announce multiple IP addresses to the CNs as alternative routing paths. Examples of such protocols include SCTP, HIP, multi-homed TCP (MH TCP) and SHIM6. Since both mobility and multi-homing address closely related issues, typically one refers to mobility when addressing both phenomena.

As far as security in the host-based mobility protocols is concerned, host-based mobility is confined to the end nodes sustaining traffic connections. As a result, trust relationships are usually unavailable to protect mobility-related signaling messages. Within the framework of HIP, for example, it was proposed to create trust relationships on a global level, i.e. for all hosts on the Internet, using PKI. As a result, the effort, as well as the scalability and revocation issues relating to creating trust relationships significantly impairs the principal advantages of host-based mobility. Thus, some proposals resort to mechanisms, such as IPsec, which requires a previously arranged trust relationship for a connection.

As a result, most host-mobility protocols have relied on methods of weak authentication, such as open exchange of random nonces, key arrangement through Diffie-Hellman exchanges and routability tests. Such solutions either provide insufficient protection, or put unnecessary processing burdens onto the end nodes.

SUMMARY

A transport connection system is set forth. The system includes a first device adapted to send and receive messages. A second device, adapted to send and receive message, is also provided. A message i generated by the first device includes a secret $Ri\text{-}1$ to a Hash ($Ri\text{-}1$) sent from the first device to the second device in a prior message $i\text{-}1$. The message i is signed by a random key $Ai\text{-}1$, the random key being derived from an update of a key $Ai\text{-}2$ from the prior message, wherein message $i\text{-}1$ is signed by the key $Ai\text{-}2$.

BRIEF DESCRIPTION OF THE DRAWINGS

FIG. 4 illustrates an embodiment of a binding update constructed in accordance with the principles herein.

DESCRIPTION

Figure 1:
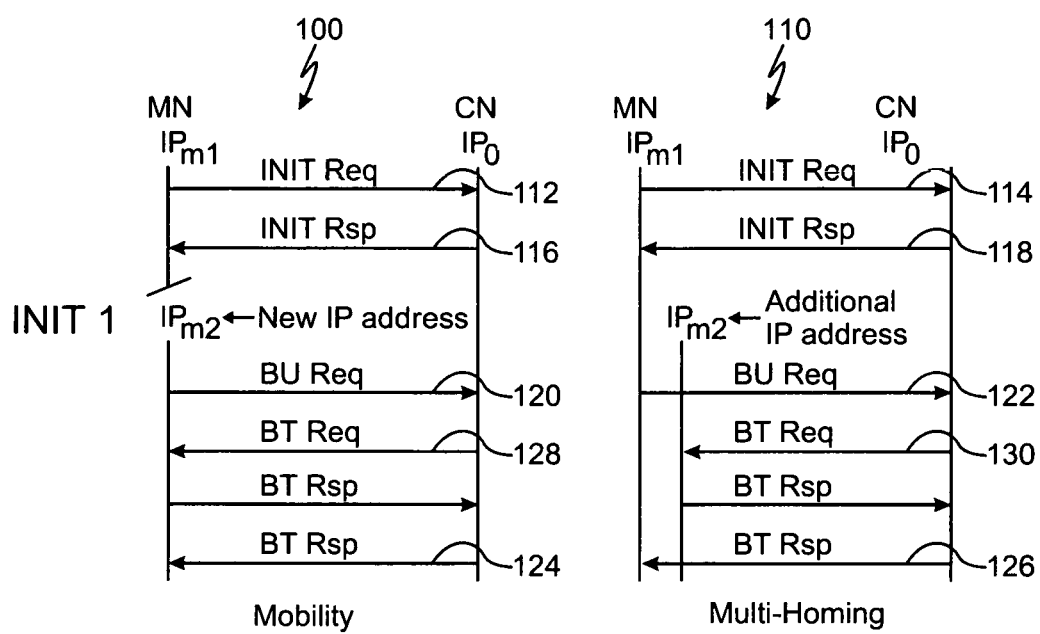
FIG. 1 illustrates an embodiment of an INIT handshake of a system designed in accordance with the principles herein.

A light-weight security solution to protect a host-based mobility protocol from redirection and flooding attacks is set forth. Host-mobility, as referred to herein, is the migration of transport-connection end-points from one IP address to another, and applies to mobility events and multi-homing scenarios. The solution herein combines methods of weak authentication with proof of session ownership capabilities. The solution requires additional, and sometimes substantially more effort for an adversary to successful launch an attack than equivalent attacks against existing signaling protocols on the internet. Advantageously, the solution can be used to improve Mobile IPv6 with route optimization.

In accordance with the principles herein, the requirement for a mutual trust relationship and/or network-based infrastructure, such as network-side anchors, is eliminated. The solution is light-weight, in that it requires minimal processing and state information to be held on either end of the connection. The security level is sufficient compared to existing internet security solutions. The solution is at least as secure as known protocols for protecting against redirection attacks. The solution is better than known security protocols for preventing flooding attacks.

In accordance with the principles herein, each mobility session supports mobility-related signaling and security between two hosts. Traffic connections run in parallel to the mobility session. Each mobility session defines at least one mobility association (MA). The MA establishes a simplex mobility session between a mobility node (MN) and a correspondent node(CN). Simplex MA's also reduce the risk of redirection attacks since the CN does not send IP address updates, only the MN. Host-based mobility sessions of simplex nature reduce the security-related signaling and processing efforts, as well as the amount of state needed to be held at each end of the connection.

Each MA is owned by one of the two hosts and provides the owner host with mobility support. MN provides proof of ownership of the MA to CN, and CN confirms routability to MN through a single branch RRT "(Return Routability Test)". MN can prove ownership of the MA by maintaining and using a symmetric authentication key. MN can regularly update the key based on CN's messages. MN can further authenticate requests, to protect against passive attackers, by relating a secret related to a prior message to create a chain of proof of the same sender. The proof of ownership protects against session hijacking and session interruption.

If both hosts are mobile, the system herein can be adapted to establish a duplex mobility session, wherein each host has to support its own MA within the same mobility session. In other words, a session would include two superimposed simplex mobility sessions, resulting in a session that appears to be duplex, but with reduced processing requirements. Each host can, via the MA it owns, change their IP addresses without breaking ongoing transport connections, and can be applied to wireless networks as well as wireless multi-homing scenarios. The MA's must be established before or during the setup of associated traffic connections in order to prohibit an attacker from overlaying an MA onto an existing traffic connection or to hijack the session after setup. Further, the system provides greater security against session hijacking than MIPv6, without requiring network support or processing overhead of DH-based key exchanges or mutual trust relationships. MN can also use the MA to determine if a peer supports host-based mobility.

As illustrated in FIG. 1, systems including mobility sessions supporting only one MA require less state information and processing on each host. Such systems provide improved security over known systems, since session hijacking cannot be performed on behalf of the stationary host. These advantages are substantial, since a large percentage of mobile Internet traffic involves stationary servers.

An MA, shown generally at 100 for Mobility and at 110 for Multi-homing is established via any suitable initial handshake, commonly known as an INIT, which can include, for example, an INIT request 112, 114 and an INIT response 116,118. The initial handshake is supported by all host-based mobility and multi-homing protocols. The initial handshake also defines the mobility session itself.

After the initial handshake, all further handshakes occur on behalf of one MA, i.e. they only affect security-parameters pertaining to the owner host, who announced the mobility event. This allows both end points of a mobility session to exercise mobility-related signaling handshakes with temporal overlap.

To protect mobility-related signaling, we assume that all mobility-related events require at least a 2-way handshake, consisting of Request 120, 122 and Reply 124,126 messages, which we refer to as a Binding Update (BU) exchange. The request 120, 122 is sent by the MA owner to announce addition, deletion or change of an IP address. The request 120, 122 is acknowledged by the peer in the reply 128, 130. Such handshakes are generally in compliance with host-based mobility protocols.

In order to protect against DoS, or flood attacks, and session hijacking, the sender of the BU request 120, 122 must assert ownership of the MA, i.e. the end point of the mobility session. This is equivalent to establishing that a host owner has generated and sent all prior MA-related requests, and received all prior MA-related replies, including the initial INIT exchange messages 112, 114.

The host owner authenticates the request by revealing a secret related to a previous request. This will create a "chain of proof" that the host owner is in fact the same sender. The secret can be a cryptographic hash over a random number R generated in every request.

The host owner signs the request with a symmetric authentication key, which is updated by the peer (i.e., CN) in every reply message. This proves that the host has received all prior replies. In this manner the messages are interlinked, which provides the security of the system. Interlinking the messages proves that the sender of the i-th message is identical to the sender of the first message of a session.

Figure 2:
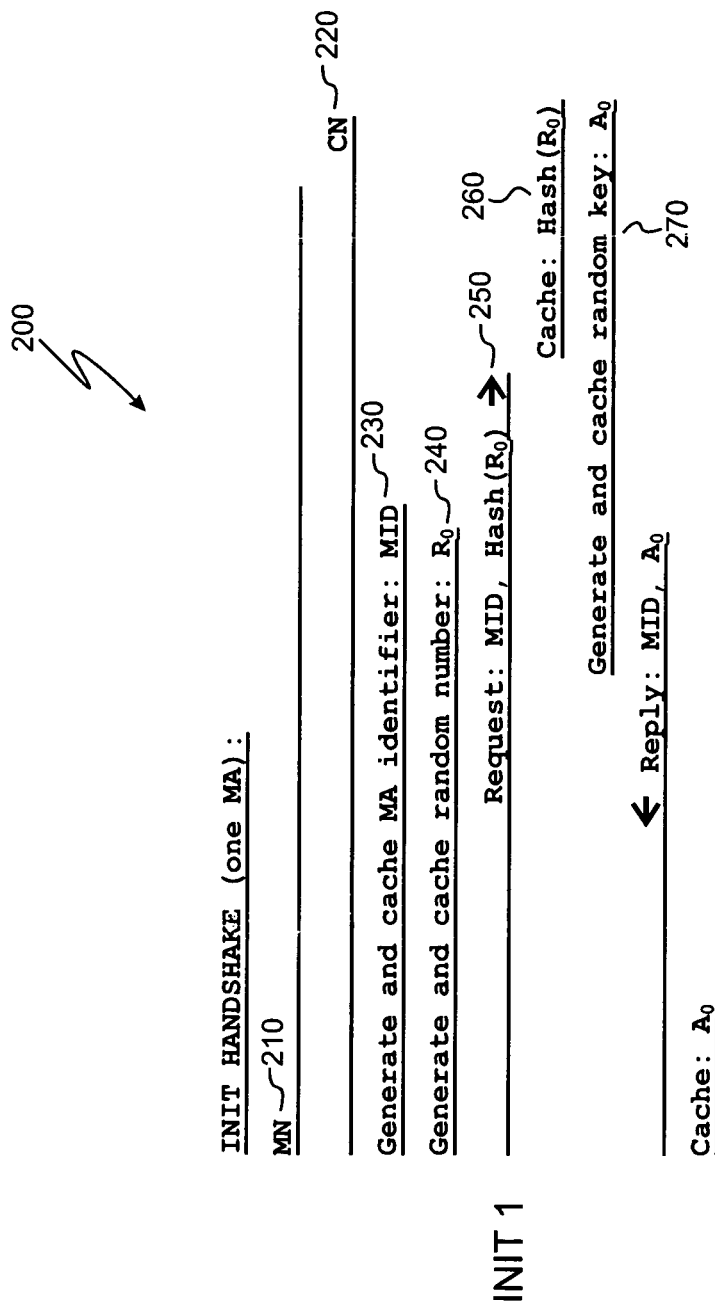
FIG. 2 illustrates an embodiment of an INIT handshake for one Mobility Association (MA) constructed in accordance with the principles herein.

FIG. 2 illustrates the INIT handshake for a mobility session supporting one MA, shown generally at 200. The MA owner, or host owner, is, for example, an MN 210 with a peer CN 220.

The MN 210 generates and caches an MA identifier MID at 230. The MID 230 can be a random number. The MN 210 also generates and caches a random number, or nonce $R_0$ at 240. The MN 210 then sends the request MID, Hash($R_0$), 250, to the CN 220. The CN caches $R_0$ at 260. CN then generates and caches a random key $A_0$ at 270. The CN then sends the MID and the random key $A_0$, openly, to the MN 210. The MN 210 then caches $A_0$.

Both $R_0$ and $A_0$ must be random numbers. Since the MN only sends Hash($R_0$), an adversary eavesdropping on the message is not able to guess $R_0$ itself. The corresponding hash function can be any suitable hash function, such as, for example, SHA1, SHA256, or any other suitable hash function. Note that the peer openly returns the initial key $A_0$. In this manner, MN proves in every message that it sent the prior message.

The MID allows a node to recognize the sending peer as well as the mobility session even when the message arrives from a different IP address. In the current scenario, one MID is introduced per MA. It is also possible to simply use one common MID per mobility session. Mobility and multi-homing protocols typically include such a property.

Figure 3:
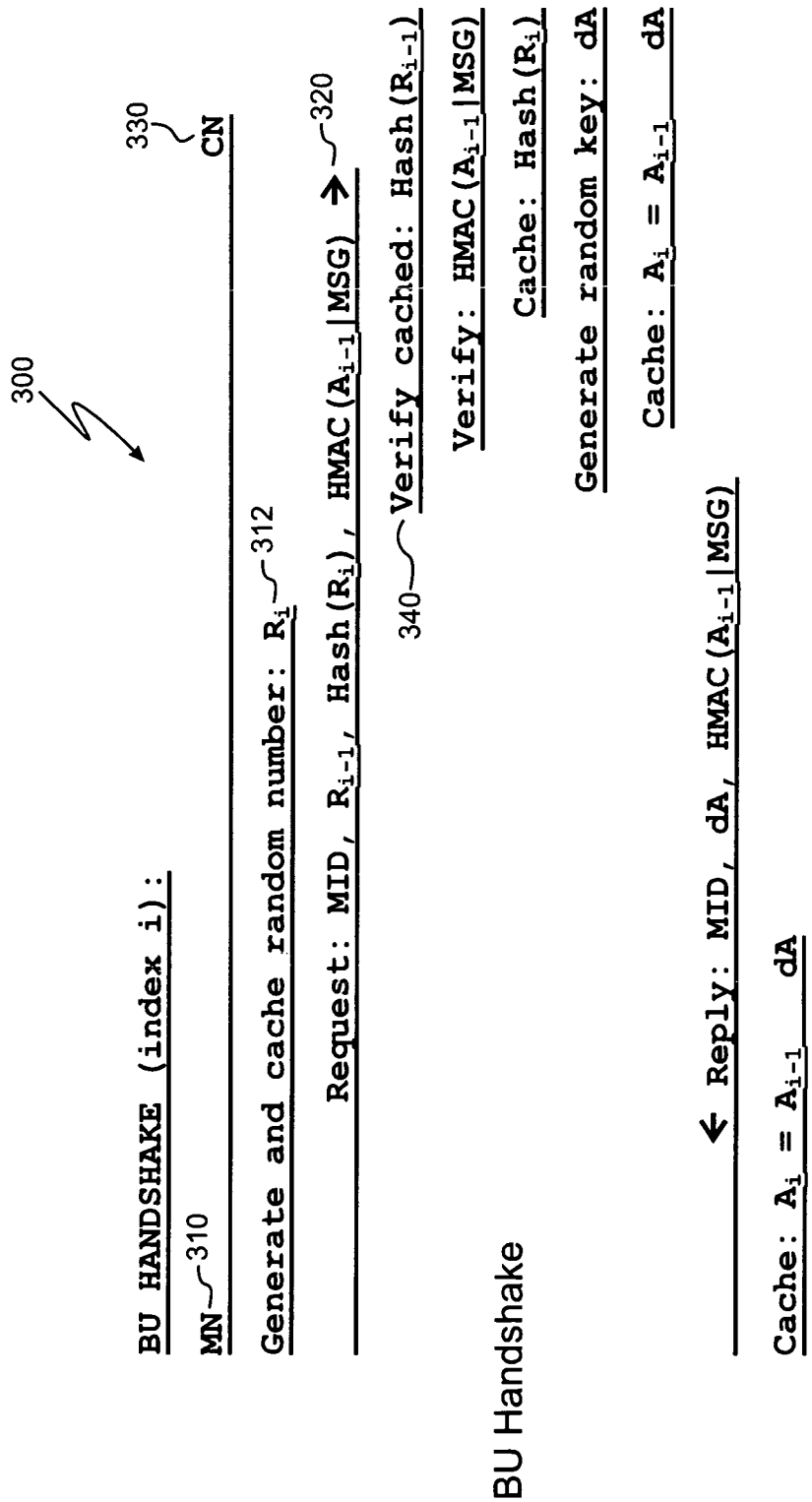
FIG. 3 illustrates an embodiment of a binding update handshake constructed in accordance with the principles herein.

As illustrated in FIG. 3, the system can now perform an ith binding update (BU) handshake.

The index i-1 refers to the previous BU or to INIT for i=1. The BU handshake also contains parameters relevant to the mobility event, such as the MN's new IP address, for instance, which depend on the specific protocol implementation, as is shown below with respect to FIG. 4.

Referring to FIG. 3 the term HMAC(A|MSG) represents a hash-based or any other kind of Message Authentication Code that is based on key A and applied to the entire message body. HMAC can, for example, be based on a SHA family member. The ⊕ symbol refers to a bit-wise XOR operation. Any other operation, e.g., addition in a group, can be chosen that fully randomizes the result if any one of the inputs is random. The XOR operation was chosen for its efficiency.

As illustrated generally at 300, a binding update (BU) handshake uses parameters gained by the initial handshake of FIG. 2 to generate the BU. The MN 310 first generates and caches a random number Ri at 312. The MN 310 then send the request MID, $R_{i-1}$, Hash(Ri), HMAC($A_{i-1}$|MSG) at 320 to the CN 330. The CN 330 verifies the cache of Hash($R_{i-1}$) at 340 and verifies HMAC($A_{i-1}$|MSG) at 350, such that CN can verify that MN is the same host that sent the prior message.

The CN 330 then caches Hash of a new random nonce, Ri at 360. This allows MN to repeat the proof in the following KU (Key Update) handshake. Only an active attacker can overcome the hash protection chain, since a passive attacker cannot compute nonce Ri. The CN 330 generates a random key dA at 370, and caches Ai=$A_{i-1}$+DA at 380. The CN only forwards dA in the next operation, such that MN receives the increment.

CN 330 can then send a reply, such as, for example, MID, dA, HMAC($A_{i-1}$|MSG), shown at 390 to the MN 310. The MN 310 can then cache Ai=$A_{i-1}$+dA at 395. Since CN only forwards an increment of the random key to MN, an attacker must be present all the time during the session to get all the messages, or has to know what the key is. The index i-1 refers to the previous key update, or to the MA establishment if i=1. The Ri-1, Hash Ri sequence ensures that a linked chain in time is established, which proves MN is the sender of all prior messages.

In order to break the protection of a security mechanism or linked chain, illustrated in FIG. 3, an attacker must eavesdrop on the link from the MN to the CN, wait until the next BU arrives from the MN and stop the propagation of this message, reinsert a copy of this message with a new, self-chosen value for Hash($R_i$), while spoofing the MN's IP address, and listen to all packets from CN addressed to MN since INIT to obtain knowledge of $A_{i-1}$ and sign the forged request.

MN also signs each key update sent to CN with the key Ai-1, wherein the base key $A_0$ is sent by CN to MN during MA establishment. The key update combined with the Ri-1, hash Ri sequence provides proof to CN that MN established the MA.

As illustrated in FIG. 4, an embodiment of the binding update, BU, can include, for example, combing an RRT with the key update, as shown generally at 400. A challenge reply 450 can be generated by the CN 420 to verify the sender prior to caching the new IP address at 460, after temporarily caching the new IP address at 440.

The chain of BU handshakes provides an even higher level of protection since the attacker has to be present for the entire session, or time frame since INIT, and, further, must wait for a legitimate BU Request issued by the MN.

The CN's reply is further singed by the updated key $A_{i-1}$. This HMAC does not provide any additional security in case an attacker has broken key A and rewritten Hash($R_i$). However, it allows the MN to mitigate DoS attacks onto the MA itself. That is, without the HMAC, a transient attacker could easily break the mobility connection by sending an arbitrary key update.

In the event that one of the above BU messages fail, the BU handshake is not complete. In this case, the MN should retransmit the BU. The retransmitted message should be an exact copy of the prior message. In the event that the CN did receive the prior message but the reply was lost, the CN realizes that the Hash(R)-value contained in the retransmitted message is the same as the value it already holds. This allows the CN to distinguish between a new BU messages and a retransmitted BU message. The CN should respond to retransmissions with the same dA it sent in the prior reply. For this purpose, the CN has to cache dA for period of time after a reply was sent.

The above BU exchange is also protected against replay attacks, since every BU contains a new secret, and the solution is unknown to the adversary. In the event that the adversary replays a BU request hoping that the CN accepts it as a retransmission, the CN can detect the content mismatch between a replayed and an original BU request, and discard the replayed message.

Since the HMAC merely serves as a proof for the MN to assert its knowledge of key $A_{i-1}$ it does not have to cover the entire content of the BU request. This is important for BU requests sent from behind network address translators (NAT), where the packet's source address is changed by the NAT and the CN has to take MN's new IP address from the packet header itself. The present security solution is therefore compliant with NATs.

Figure 5:
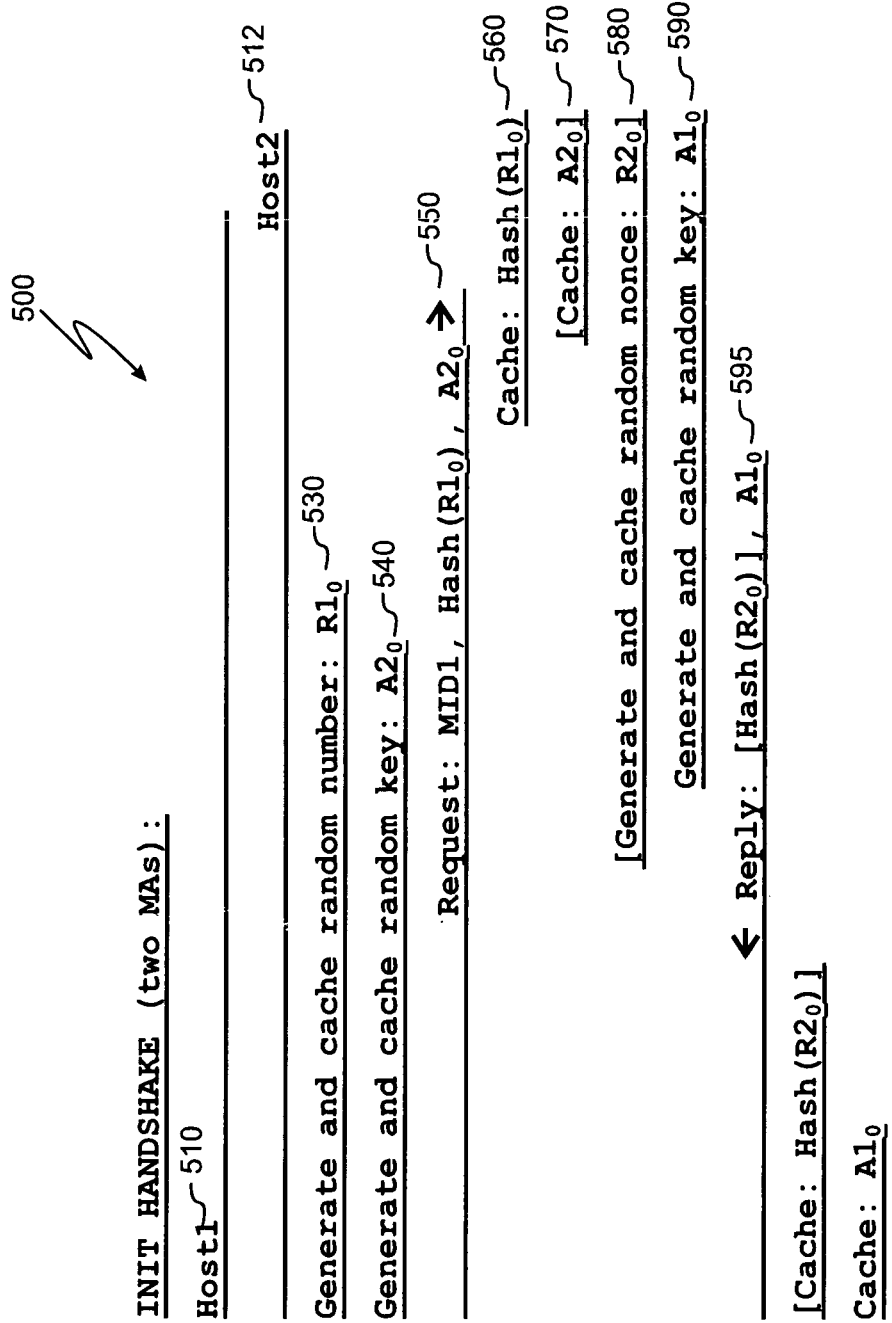
FIG. 5 illustrates an embodiment of an INIT handshake for two MA's constructed in accordance with the principles herein.

In the event that both hosts of the mobility session are mobile, each host can be configured to support their own MA, wherein the initial handshake can still be embedded into a 2-way message exchange as illustrated, for example, in FIG. 5. The session can be referred to as a duplex mobility session, wherein each host owns its' own MA. MA establishment and key update can be performed symmetrically, wherein corresponding handshakes pertaining to each MA can be folded into a message, which reduces the number of messages to be sent.

As illustrated generally at 500, each host can generate and cache a random nonce and a random key, such as, for example a host 1 510 and a host 2 520. The host 1 can generate random nonce 530 and random key 540 and send at 550 to host 2 520. Host 2 520 can then cache the nonce and the key from host 1 at 560 and 570, respectively. Host 2 can then generate a second random nonce 580 and second random key 590 and send to host 1 510 at 595.

The respective parameters for $R1_0$ and $A1_0$ of Host 1's MA are $R2_0$ and $A2_0$ for Host 2's MA. Host 1 proactively passes $A2_0$ in the INIT request, assuming that Host 2 is mobile. In the event that Host 2 is not mobile, it simply ignores this parameter and proceeds as shown in the prior INIT exchange above. Otherwise, it exercises all operations and passes parameters, such as the parameters illustrated in FIG. 5.

Since IP addresses do not occur symmetrically, the binding updates are individually processed for each host over their respective MA, whereas the key exchange can occur symmetrically. Further, if sequence numbers are used for the BU's, each MA must support its' respective sequence number. In addition, the two MA's can share the same MID. The resulting handshakes can be shown in an embodiment, for example, of FIG. 5.

When an adversary uses mobility signaling to conduct flood attacks, securing BU messages provides no defense against the attack, since the adversary himself establishes the mobility session. Therefore, an additional security mechanism is needed. Preferably, the additional system uses a simple routability test, such as the binding test (BT) illustrated in FIG. 6.

Assuming that MN is the host holding the MA, the BT handshake is initiated by the CN whenever the MN announces a new IP address. It has to involve MN's new address even if the BU request was sent from the old address. Where the CN sustains multiple IP addresses, it would be sufficient to use only one of them for the routability test, since this ensures that the MN can be reached at the new location. There may be technical reasons to conduct routability tests from all of the CN's IP addresses to the MN's new address. For example, such a procedure may determine availability of certain paths.

The routability test involves a challenge sent by the CN to the MN, shown generally at 600. The CN 610 sends the challenge which must be answered in a response by the MN 620. The CN 610 has to ensure completion of the BT handshake before it sends larger amounts of traffic to the MN's 620 new IP address.

The hosts 1 and 2 can be any suitable hosts. For example, where both hosts 1 and 2 are mobile, the hosts can be suitable mobile devices, such as, for example, a server, laptop, PC, smart phone, television, pda, gaming device, push-to-talk device, and peripheral device.

Figure 6:
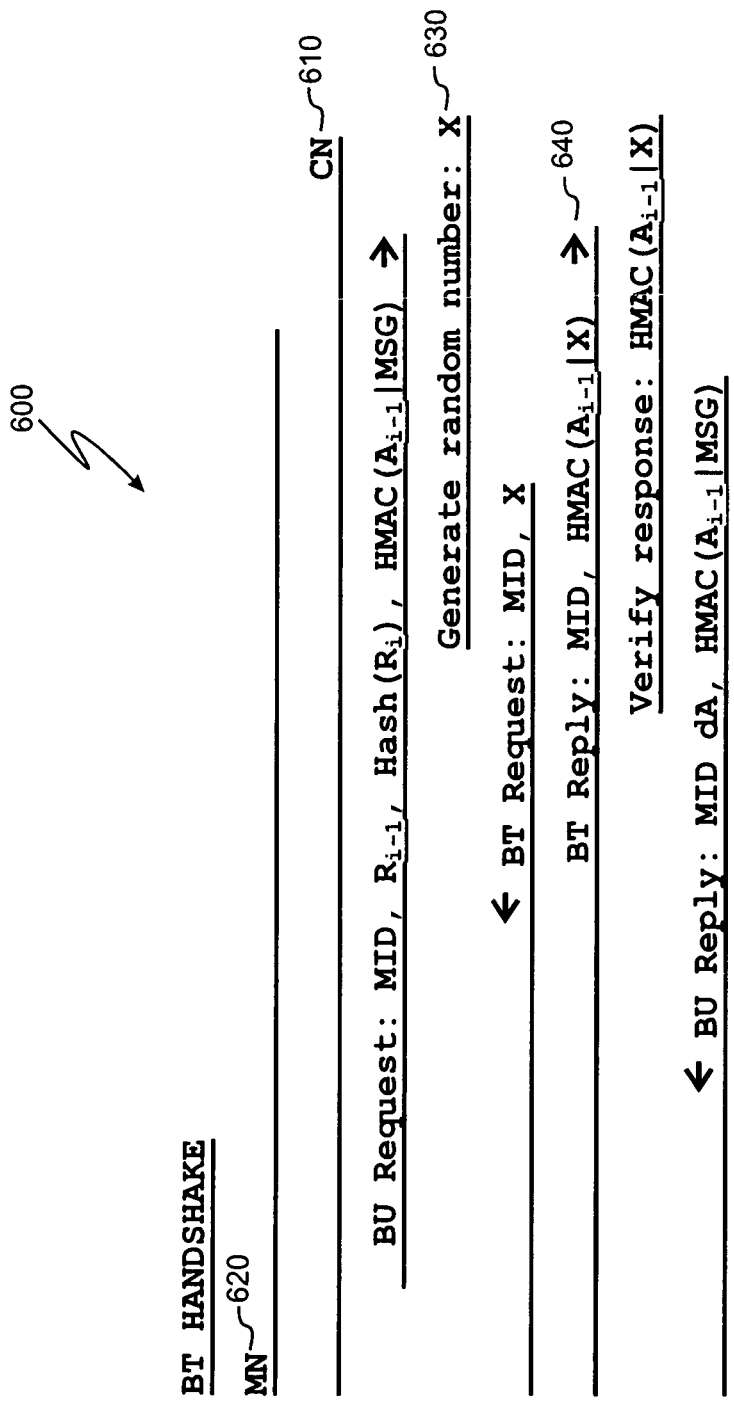
FIG. 6 illustrates a BT handshake constructed in accordance with the principles herein. an embodiment of an MA pair key update constructed in accordance with the principles herein.

The BT handshake can be embedded into the BU handshake, as illustrated in FIG. 6. A challenge message contains a random number X at 630. The response includes the signature of X based on the current key $A_{i-1}$ at 640. This confirms to the CN 610 that the MN 620 is reachable at the newly announced IP address, and that the BT response 640 was not forged.

Figure 7:
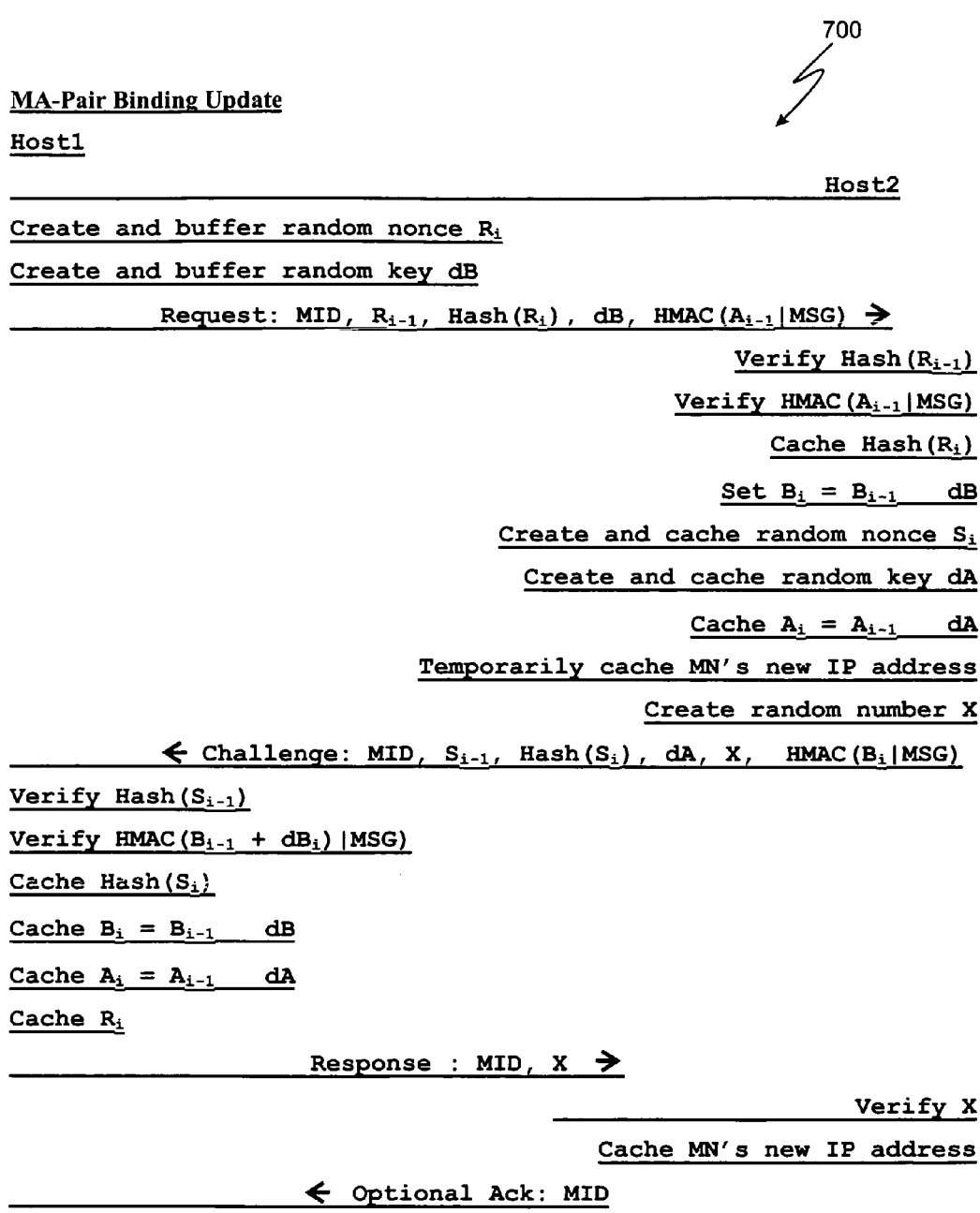
FIG. 7 illustrates an MA pair binding update constructed in accordance with the principles herein.

FIG. 7 shows the message flow shown generally at 700 for a multi-homed MN that announces a new IP address sending the BU Request from its initial IP address. The BT handshake uses the MN's new IP address while the envelope BU handshake uses MN's initial IP address. A challenge message 710 is protected by HMAC($B_i$|MSG), such that the key signature used to reply in simplex mobility session is not required here.

FIGS. 6 and 7 are exemplary embodiments only, and are not meant to limit the manner in which the routability test can be performed in accordance with the principles herein, since there are other ways to conduct a routability test that provide the same principle protection.

Figure 8:
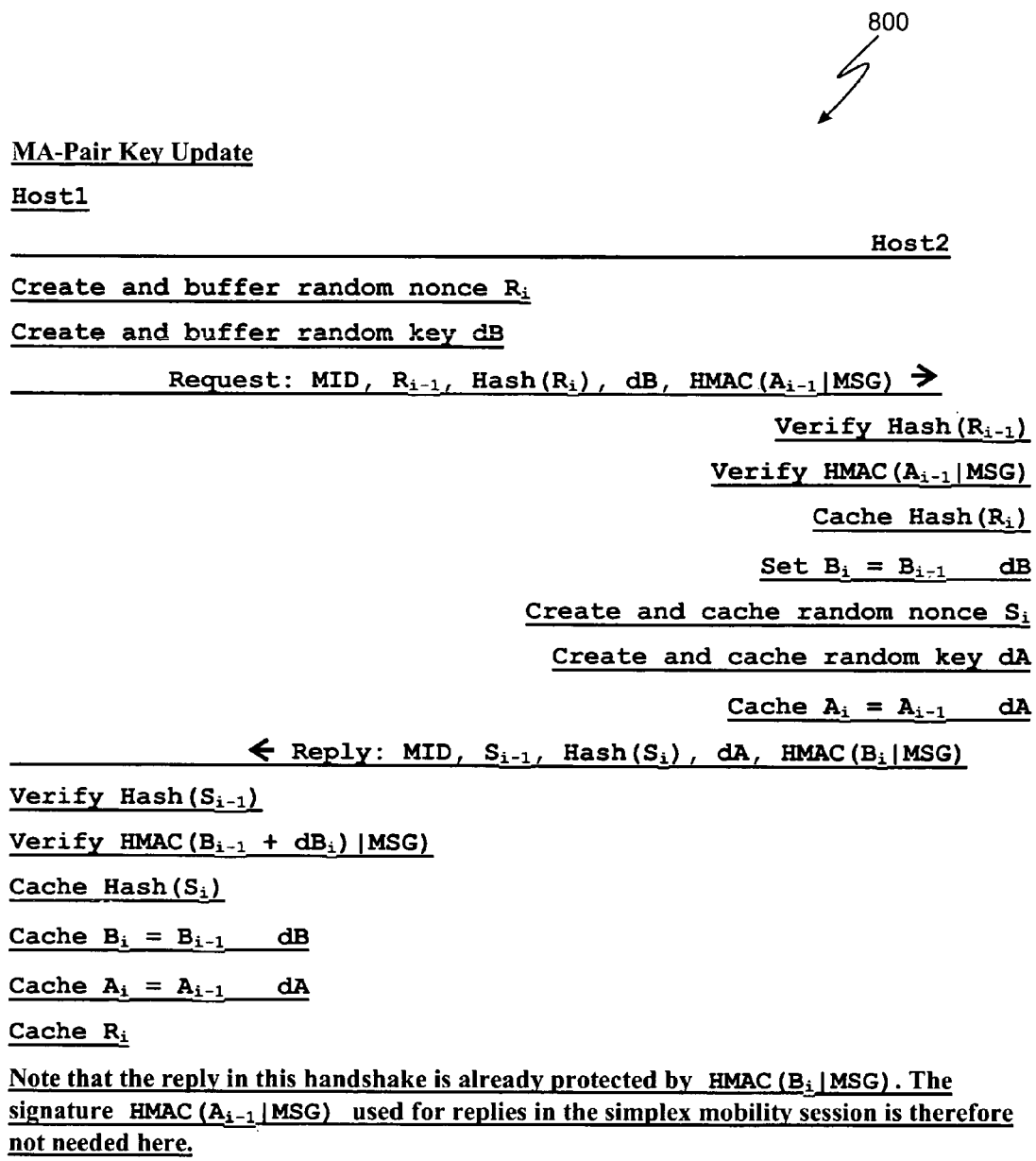
FIG. 8 illustrates an embodiment of an MA pair key update constructed in accordance with the principles herein.

Additionally, the MN should embed an MA key update handshake into all data exchanges with the CN. The key update of the index i can include, for example, embedding the key update into the binding update, as illustrated in FIG. 8. The RRT is performed for only one MA, while the key exchange can be performed symmetrically. The length of the random numbers, i.e. secret R, key A and challenge X, have to be chosen large enough to advert attacks via brute force. The average likelihood of breaking these numbers through brute-force methods is given by $2^{(L-1)}$, where L is the bit length of the corresponding number. A value of L=50 to 60 bits is more than sufficient given the computation power at present and in the near future.

In accordance with the principles herein, the MS can only provide host-based mobility security for connections established during or after the MA establishment. As a result, MN and CN have to hold a table for each MA that specifies connections that can be migrated underneath an MA. In the table, the connections can be specified in a suitable manner, such as via a 5-tuple including {protocol type, source IP, address, destination address, source port number, destination port number}. Connections sustained between MN and CN prior to establishing MA do not get added to the table, only new connections after MA is established.

In accordance with the principles herein, it is possible to have a one-to-one mapping between a traffic connection(s) and MA or an MA pair. In this instance, all information associated with MA or MA pair can be held in the protocol control block of the traffic connection, and therefore a connections table would not be needed.

Additionally, all non-security related messaging can be piggy-backed onto the KU and BU handshakes in the MA, such as policies or IP addresses designated for a subset of connections, or other related information.

Figure 9:
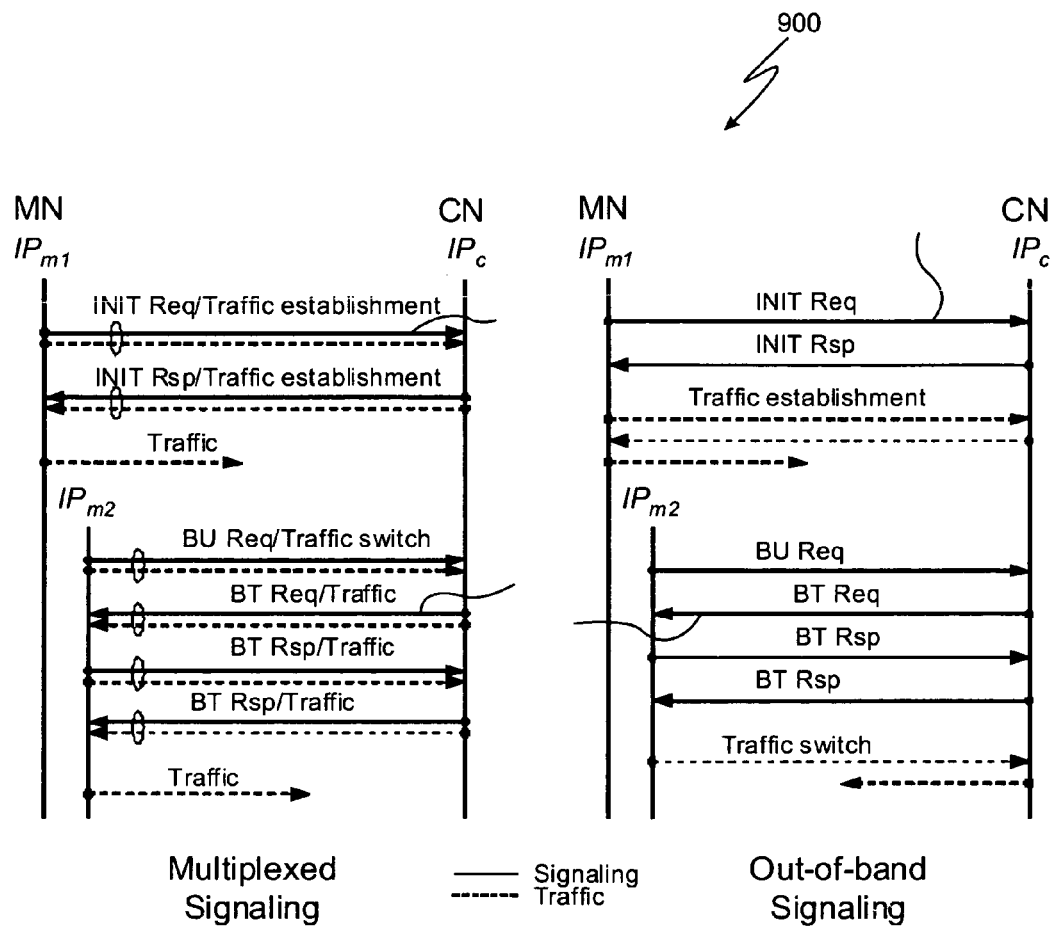
FIG. 9 illustrates an embodiment for linking traffic connections for multiplexed signaling and out-of-band signaling in constructed accordance with the principles herein.

As illustrated in FIG. 9, the mobility session must be properly linked to traffic connections to prevent an attacker from taking over connections between MN and CN. To avoid this vulnerability, the mobility session must be started at the same time or prior to formation of the traffic connection. Also, the IP addresses for the traffic connection and mobility session must be the same. Additionally, mobility sessions should terminate as soon as corresponding traffic connections have terminated. This prevents an adversary from preemptively creating a mobility session with CN spoofing MN's address in order to hijack future traffic connections between MN and CN.

Inter-host signaling can be carried out via a suitable method, such as, for example, UDP. A new protocol type could also be introduced for this purpose, as was done for HIP, for example. Further, the messages can be multiplexed into the traffic connections via packet header as proposed, for example, with TCP migrate.

All of the embodiments set forth herein include principles achieved via a system and method adapted and constructed to operatively facilitate secure communication between communication devices, such as computers, cell phones, pda's, televisions, and the like. As such, each exemplary system or method herein contemplates the operative connection of signals to a communication, wireless, or other network over which encryptions are capable of being transmitted between communication devices.

The embodiments herein have been described and shown for purposes of illustration only, and are not to be construed as constituting any limitations of the present principles. Modifications will be obvious to those skilled in the art, and all modifications that do not depart from the spirit of the principles herein are intended to be included within the scope of the appended claims. Those skilled in the art will appreciate that the conception upon which this disclosure is based, may readily be utilized as a basis for the designing of other structures, methods and systems for carrying out the several purposes of the present principles.

Therefore, the foregoing is considered as illustrative only of the principles herein. Further, since numerous modifications and changes will readily occur to those skilled in the art, it is not desired to limit the principles to the exact construction and operation shown and described, and accordingly, all suitable modifications and equivalents may be resorted to, falling within the scope of the principles described herein.

We claim:

1. A mobility host for selectively connecting to a correspondent node (CN) comprising:
a communications interface for exchanging messages with the CN during a mobility session;
a computer processor operatively connected to the communications interface, for generating messages, wherein a message i sent from the mobility host to the CN comprises at least a cryptographic hash of a random key $R_i$ generated and cached by the computer processor, a random key $R_{i-1}$ of an $i^{th}-1$ mobility host message, and a MAC (Message Authentication Code) based on a key $A_{i-1}$ calculated using a random increment dA received from the CN in an $i^{th}-1$ message.

2. A method of operating a security protocol in a mobility node MN connected to a correspondent node CN across a network in a mobility session, comprising:
generating a cryptographic hash taken over a random nonce $R_i$ and caching the random nonce $R_i$ at the MN;
sending an $i^{th}$ MN message, of a series of messages, to the CN during the mobility session, the $i^{th}$ MN message containing the cryptographic hash of the random nonce $R_i$, a random nonce $R_{i-1}$, and a hash-based Message Authentication Code (HMAC) based on a cached random key $A_{i-1}$ (HMAC($A_{i-1}$));
receiving, from the CN, an $i^{th}$ CN message containing a random key dA, and HMAC($A_{i-1}$);
generating a random key $A_i$ by adding random key dA to the cached random key $A_{i-1}$ and caching $A_i$ at the MN;
generating a new random nonce $R_{1+1}$; and
sending an $i^{th}+1$ MN message from the MN to the CN, the $i^{th}+1$ MN message including a cryptographic hash of the new random nonce $R_{i+1}$, the random nonce $R_i$ and HMAC($A_i$) based on the random key $A_i$.

3. The method of claim 2, further comprising the step of receiving an $i^{th}+1$ message from the CN,
said message comprising a new random key dA and a MAC based on the random key $A_i$.

4. The method of claim 2, wherein the MN includes a peripheral device operatively connected to a network node at an attachment point, wherein the peripheral device has an IP address.

5. The method of claim 2, wherein the random nonce $R_{i-1}$ is an initial nonce.

6. The method of claim 5, wherein each message received from the CN contains a HMAC over at least part of a return message body containing a prior nonce.

7. The method of claim 2, wherein the mobility session begins prior to or simultaneously to formation of a transport connection between the MN and the CN.

8. The method of claim 2, wherein the mobility session begins prior to or simultaneously with formation of a transport connection of multiple transport connections sustained between the MN and the CN.

9. The method of claim 8, wherein the mobility session ends after at least one of the transport connections and the multiple transport connections between the MN and the CN terminates.

10. The method of 2, wherein at least one of the MN or the CN includes at least one of a server, laptop, PC, smart phone, television, pda, gaming device, push-to-talk device, and peripheral device.

11. The method of claim 2, further comprising the step of:
providing multiple physical or logical L2 interface connections with the MN, each interface connection of the multiple interface connections supporting an individual IP address.

12. The method of claim 2, wherein the MN supports multiple IP addresses, further comprising the step of:
providing one physical or logical L2 interface connection.

13. The method of claim 12, wherein one of the multiple IP addresses is an active IP address, and wherein the MN updates the CN with a second message when identity of the active IP address changes.

14. The method of claim 2 wherein the MN is designated as a first mobile host (FMH) and the CN is designated as a second mobile host (SMH); and
the FMH and the SMH selectively send updates regarding changes in attachment points via respective first and second transport connections during a session, or time frame, via signaling messages.

15. The method as set forth in claim 14, wherein the FMH generates a first independent key (FIK) for the first transport connection and the SMH generates a second independent key (SIK) for the second transport connection.

16. A mobility node (MN) comprising:
a computer processor, operatively connected to the MN for processing messages;
a communications interface, operatively connected to the computer processor, for exchanging the messages with a correspondent node (CN);
wherein the computer processor generates a signaling message for sending an IP address update to the CN in the event that the IP address of the MN changes; and
an $i^{th}$ mobility host message sent from the MN to the CN comprises at least a cryptographic hash of a random key $R_i$ generated and cached by the computer processor, a random key $R_{i-1}$, of an $i^{th}-1$ mobility host message, and a MAC (Message Authentication Code) based on a key $A_{i-1}$ calculated using a random increment dA received from the CN in the $i^{th}-1$ mobility host message.

17. The MN as claimed in claim 16, wherein the computer processor is operatively connected to a USB memory storage device, and wherein the USB memory storage device includes a self-executing algorithm for generating, sending, receiving, and storing the signaling message in conjunction with the computer processor.

18. A correspondent node (CN) for facilitating a mobility association (MA) with a mobility node (MN) comprising:
a communications interface for exchanging messages with the MN;
a computer processor operatively connected to the communications interface, for receiving and verifying messages from the MN comprising at least a hash of a current random key, a previous random key and a message authentication code (MAC) applied to at least part of the messages using a CN random key, and said computer processor also configured to generate a random increment of the CN random key and to include the random increment in a message returned to the MN, wherein the CN verifies all prior messages from the MN.

19. A method of operating a security protocol in a correspondent node CN connected to a mobility node MN across a network in a mobility session, comprising:
receiving an $i^{th}$ MN message containing a cryptographic hash of a random nonce $R_i$, a random nonce $R_{i-1}$, and a hash-based Message Authentication Code (HMAC) based on a cached random key $A_{i-1}$ (HMAC($A_{i-1}$)) during a session;
verifying the received random nonce $R_{i-1}$;
caching the cryptographic hash of the random nonce $R_i$;
generating a random key dA and computing a random key $A_i$, such that $A_i$ equals $A_{i-1}$ plus the random key dA, and caching the random key $A_i$ at the CN;

sending a reply message to the MN containing the random key dA and the HMAC($A_{i-1}$); and receiving an $i^{th}+1$ MN message from the MN, the $i^{th}+1$ MN message including a cryptographic hash of a new random nonce $R_{i+1}$, the random nonce $R_i$, and an HMAC ($A_i$).

20. The method of claim 19, further comprising the steps of:

verifying the cryptographic hash of the random nonce $R_i$;

verifying the HMAC($A_i$);

caching the cryptographic hash of the new random nonce $R_{i+1}$;

generating a second random key dA and computing a random key $A_{i+1}$, such that $A_{i+1}$ equals $A_i$ plus the second random key dA, and caching the random key $A_{i+1}$; and forwarding the second random key dA and an HMAC($A_i$) to the MN.

21. The method of claim 20, further comprising the step of sending subsequent random keys $dA_i$ to MN, after receiving subsequent messages from the MN.

22. The method of claim 20, wherein a transport connection is formed from the CN to the MN, and wherein the CN updates the MN with changes to an attachment point of the CN during the mobility session via the transport connection.

23. The method of claim 20, further comprising the step of:

receiving a network-attachment-point change message at the CN, wherein the CN verifies that the cryptographic hash of the random nonce $R_{i-1}$ is the same as the cryptographic hash of the random nonce $R_{i-1}$ contained in the network-attachment-point change message before further processing the message.

24. The method of claim 20, further comprising the step of verifying HMAC($A_{i-1}$) at the CN.

25. The method of claim 22, wherein the MN and the CN sustain subsets of transport connections, and further comprising the step of applying the update to one of the subsets of transport connections.

* * * * *